Aug. 6, 1968  F. R. MOISDON  3,395,666
WATER CRAFT

Filed Aug. 1, 1966  2 Sheets-Sheet 1

INVENTOR.
FRANCOIS R. MOISDON
BY E. H. Schmidt

ATTORNEY.

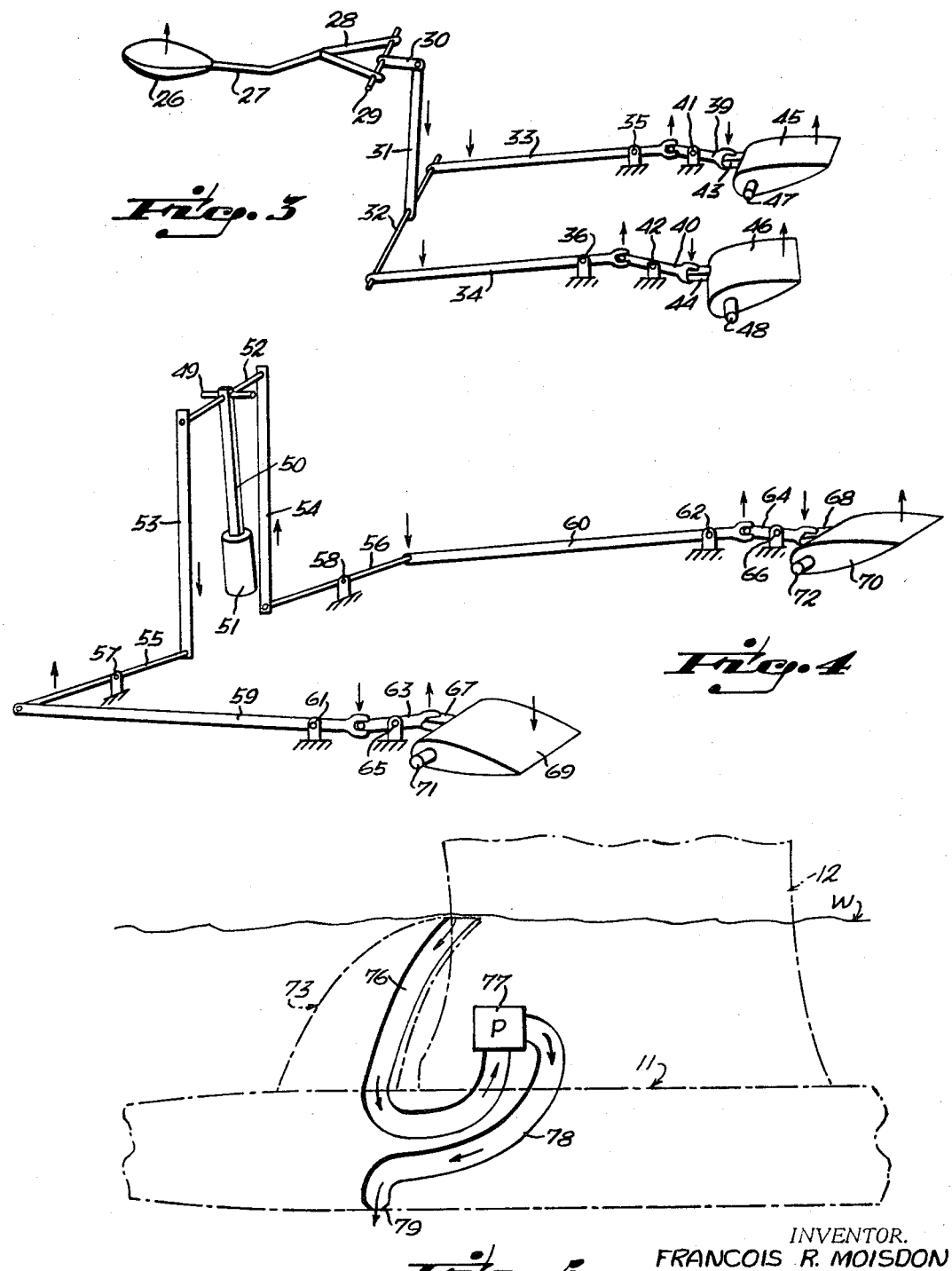

United States Patent Office 3,395,666
Patented Aug. 6, 1968

3,395,666
WATER CRAFT
Francois R. Moisdon, 1310 NE. 204th St.,
North Miami Beach, Fla. 33162
Filed Aug. 1, 1966, Ser. No. 569,377
1 Claim. (Cl. 114—66.5)

ABSTRACT OF THE DISCLOSURE

A water craft having a flat, streamlined underwater wing-structure extending upward centrally of which is a pillar structure supporting a superstructure above the water. Propulsion means is provided for moving the craft through the water. Also provided, as a means for controlling lateral stability, is a pair of stabilizer fins, one to each side and to the rear of the wing-structure, and a pendulum in the pillar structure operative, through link mechanism, to oppositely swing the fins in response to lateral swinging movement of the pendulum to correct for deviations from horizontal level position of the wing-structure.

---

This invention relates generally to water craft and is directed particularly to a novel water craft comprising a submerged, streamlined stabilizing and propelling structure supported above which, entirely above the surface of the water, is a superstructure constituting the passenger carrying quarters of the craft.

At the present time water craft can be divided, generally, into two classes, viz., those that float upon the surface of the water such as ordinary boats and ships, and submarines, which submerge in their entirety and travel under water. Of these two classes, surface floating vessels of one kind or another are used almost exclusively for the transportation of cargo and passengers, in the case of the larger of such vessels, and for sport or pleasure, as in the case of sail boats, yachts, sports boats and the like. No matter what the size of these floating vessels, however, they all have the common deficiencies of being adversely influenced more or less by the surface conditions of the body of water on which they travel, and being limited to low attainable speeds because of the high frictional drag between the water and the hull of the floating vessel as it is propelled through the water.

It is, accordingly, the principal object of this invention to obviate the above described deficiencies of floating craft and provide a novel water craft having a body or cargo and/or passenger carrying quarters in the form of a superstructure held well above the surface of the water upon a streamlined columnar member or pillar supported at its base well under the water upon a planar, streamlined, wing-shaped member including means for its propulsion horizontally under the surface of the water at comparatively great speeds, and including mechanism for automatically maintaining longitudinal and lateral stability at a given depth under water whereby the superstructure will be propelled above the surface of the water substantially unaffected by weather conditions or the surface conditions along which the craft is moving.

In this connection it will be understood that the superstructure, which travels in the comparatively low density medium of air can be moved at great speeds with only a small fraction of frictional drag that would be imposed if it were to be moved upon the water as an ordinary boat hull, and that the wing-shaped member, being highly streamlined for efficient movement through the under-surface of the water would present comparatively little resistance even though moving through the relatively high density medium of water. Also the wing will always be level in the water, to insure a smooth ride no matter what the sea conditions may be.

A more particular object is to provide a water craft of the character described which, because of its very low frictional drag while moving in the water, is capable of great speeds, and which, because of its high speed capabilities, can be efficiently motivated by jet propulsion or the like.

Yet another object is to provide a water craft of the character described wherein lateral stability at a predetermined depth is effected simply and efficiently by means of laterally and longitudinally-spaced, vertically-directed water jets in the underside of the submerged wing-shaped member fed either by water spilling into intake ports at the water surface above the respective ports and pumped out of the ports to lift one side or the other of the wing-shaped member to compensate for the slightest dipping at the corresponding side, thereby automatically and continuously seeking lateral balance if automatic control is desired, or fed by a manually controlled pumping system if manual or pilot control is desired.

Still another object is to provide a water craft of the character described including auxiliary lateral stability means in the form of a pendulum in the pillar structure operatively interconnected with stabilizer fins at the rear of the wing-shaped member to correct for lateral imbalance of the craft in response to the sideward movement of the pendulum in the pillar structure.

Yet another object is to provide a water craft of the character described having means for automatically maintaining a substantailly constant predetermined depth of the wing-shaped member while the craft is under way, thereby maintaining the superstructure at a predetermined distance above the water while the craft is in motion.

Yet another object is to provide a water craft of the character described having such buoyancy that when at rest in the water the craft will float on the surface of the water, yet which, because of low center of gravity afforded by the pendulous wing-structure, will have great stability even in heavy seas.

Still another object of the invention is to provide a water craft of the above nature wherein the wing-structure is well adapted to being equipped with moving belts or tracks, for amphibious use of the craft along level ground and for docking on dry land.

Other objects, features and advantages of the invention will be apparent from the following description when read with reference to the accompanying drawings.

In the drawings, wherein like reference numerals denote corresponding parts throughout the several views:

FIG. 3 is a schematic diagram, in perspective, of the longitudinally stability and depth control mechanism of the craft, shown separately;

FIG. 4 is a schematic diagram, in perspective, of one of the lateral stability control mechanisms of the craft, shown separately; and FIG. 5 is a schematic diagram illustrating operation of the auxiliary lateral stability control mechanism of the craft.

Figure 1:
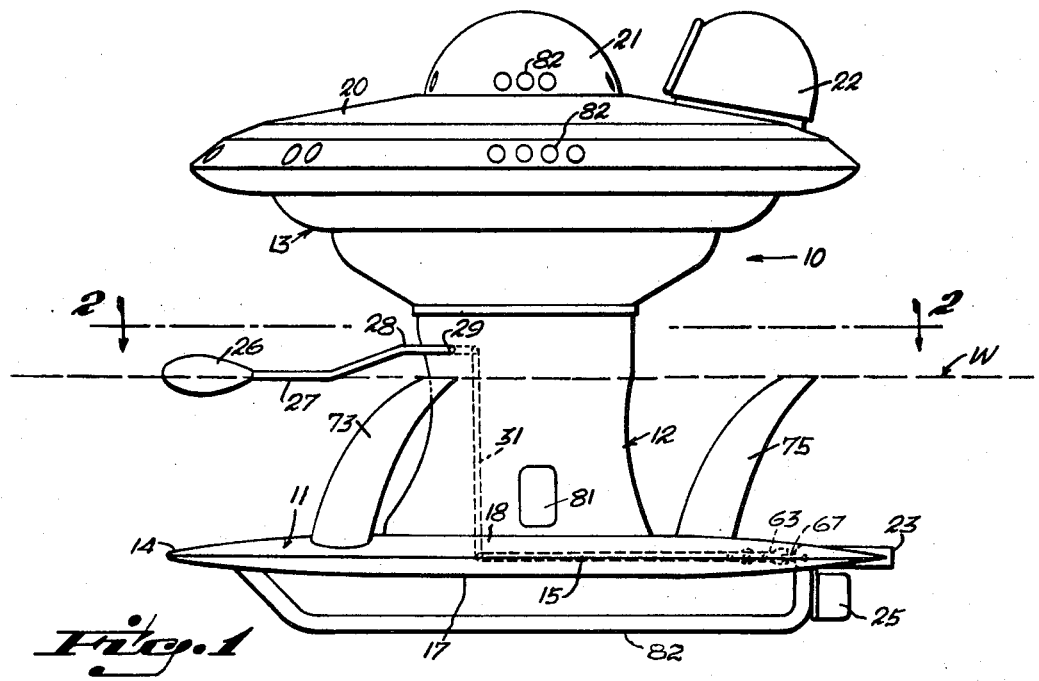
FIG. 1 is a front elevational view of a water craft embodying the invention.

Referring now in detail to the drawings, reference numeral 10 in FIG. 1 designates a water craft embodying the invention, the same being illustrated by way of example in the form of a large craft for the transportation across large bodies of water of heavy cargoes and hundreds of passengers. It will be understood, however, that the principals of the invention can be applied as well to smaller craft, and even sports craft for individual or personal use. The water craft 10 comprises, generally, a wing-structure 11, a pillar structure 12 extending vertically upwardly from the center of said wing-structure, and a superstructure 13 centrally supported at the upper end of said pillar. As illustrated in FIG. 1, the water craft 10 is of such buoyancy and so controlled when under way that the water surface will lie at about one-quarter the distance from the top of the pillar structure 12, as indicated by the broken line W. In this position, it will be seen that the superstructure 13, which may contain for the most part the passenger quarters and pilot house, is maintained well above the water surface.

Figure 2:
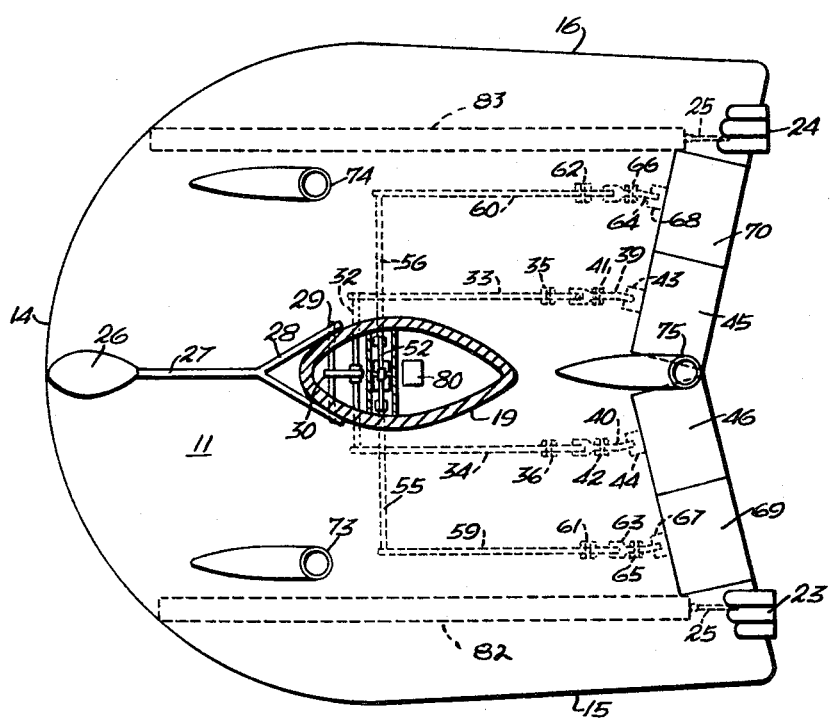
FIG. 2 is a horizontal cross-sectional view thereof, taken along the line 2—2 of FIG. 1 in the direction of the arrows.

The wing-structure 11 is preferably rounded in front as indicated at 14, and extends backwardly at each side along slightly convergent side edges 15 and 16. The underside of the wing-structure 11 is preferably formed with a slightly convex under-surface 17. The upper surface 18 of the wing-structure 11 is also of slight concavity so that said wing-structure is highly streamlined for minimum frictional drag in its movement under the surface of the water at great speeds, as is hereinbelow more fully described. As illustrated in FIG. 2, the pillar structure 12 is substantially lenticular in cross-sectional shape, as indicated at 19 in FIG. 2, thereby also presenting a streamlined surface to the water for minimum frictional drag. As illustrated in FIG. 1, the underside of the superstructure 13 is preferably bowl-shaped, and preferably not greater in diameter than the wing-structure 11 which supports it. The upper section 20 of the superstructure 13 is preferably in the shape of an inverted bowl or dish, which may be formed with a central hemispherical dome 21 providing pilot housing quarters. The rear portion of the upper section 19 of the superstructure 13 is preferably formed with a hemispherical chamber providing space for air intake ducts for the propelling reactors, auxiliary mechanical equipment and the like.

As illustrated in FIG. 2, the wing-structure 11 may be propelled through the undersurface of the water at high speeds by reactor jets 23, 24 at each side of the back of said wing-structure. Since such reactors are well known, their operation is not further described herein, it being understood that air intake ducts therefor and associated fuel and control mechanism therefor will extend up through the pillar structure 12 and into the chamber 22 as may be necessary or desirable. For steering the craft, rudders 25 are provided at the underside at the rear of the wing-structure 11, preferably one at each side. It will be understood that the rudders 25 will be automatically or manually controlled in the pilot house 21 in the usual manner and by known mechanism.

Means is provided for automatically maintaining the longitudinal stability of the craft at the depth at which the wing section 11 moves through the water. To this end a streamlined float 26 is disposed above the front center portion of the wing-structure 11 at a height thereabove substantially equal to the desired depth of said wing-structure. The float 26 is secured to one end of an arm 27 having an offset portion terminating on a bifurcated end portion 28 hingedly connected with respect to the pillar structure 12 as by a transverse pivot rod 29. As illustrated schematically in FIG. 3, the rod 29 has affixed thereto a rearwardly-extending arm 30 the outer end of which has pivotally linked thereto the upper end of a link bar 31. The lower end of the link bar 31 has affixed thereto a laterally-extending push bar 32. Pivotally linked near each end of the push bar 32 is one end each of a pair of opposed levers 33, 34 fulcrumed near the outer ends at pivot points 35, 36, respectively. The outer ends of the levers 33, 34 are bifurcated to linkingly engage end portions of a pair of short, opposed control levers 39, 40, respectively, fulcrumed at central positions therealong at pivot points 41, 42. The control levers 39, 40 are bifurcated at their outer ends to receive loosely-fitted therein rearwardly-extending lug portions 43, 44 of fin-like elevators 45, 46, respectively, hingedly connected at the rear of the wing-structure 11 at each side of the major longitudinal axis thereof.

Referring to FIG. 3 and considering the operation of the longitudinal control mechanism above described, it will be seen that as the craft extends deeper in the water, the float 26 will be relatively raised to impose a downward movement on the link bar 31 and its push bar 32. As a result, the outer ends of the opposed levers 33, 34 will be raised and the outer ends of the opposed control levers 39, 40 will be lowered. Lowering of the outer end of the short opposed levers 39, 40 results in counter-clockwise movement of the elevators 45, 46 about their hinge pins 47, 48, respectively, resulting in a correctional downward-pressure at the rear of the wing-structure, thereby stabilizing the craft. On the other hand, if the craft for any reason should begin to rise in the water, relative downward movement of the float 26 will cause simultaneous clockwise movement of the elevators 45, 46 resulting in appropriate downward movement of the wing-structure 11 of the craft for stabilization at the predesigned depth.

As illustrated in FIGS. 2 and 4, pendulum means is provided for automatically maintaining lateral stability of the craft, said means comprising a longitudinally-extending support rod 49 rotatably affixed within the pillar structure 12 near the upper end thereof. Centrally secured to the rotatable support rod 49 is the upper end of a pendulum rod 50, the lower end of which carries a pendulum weight 51. Also affixed at the upper end of the pendulum rod 50 is a laterally-extending cross bar 52. Pivotally-linked at the outer ends of the cross bar 52 are the upper ends of the pair of opposed vertically-extending longitudinal link members 53, 54. Pivotally connected to the lower end of the link members 53, 54 are one end each of a pair of opposed, outwardly-extending rocker arms 55, 56 centrally fulcrumed at pivot points 57, 58, respectively. Pivotally connected to the outer ends of the rocker arms 55, 56 are one end each of a pair of opposed, rearwardly-extending lever arms 59, 60 fulcrumed near their outer ends at pivot points 61, 62, respectively. The outer ends of the lever arms 59, 60 are bifurcated to linkingly engage inner end portions of a pair of short lever arms 63, 64, respectively, centrally fulcrumed at pivot pins 65, 66. The outer ends of the short lever arms 63, 64 are bifurcated to linkingly engage rearwardly-extending lug members 67, 68, respectively, of lateral stability control fins 69, 70 journalled for movement about respective hinge pins 71, 72. In operation, it will be understood that as the craft wing-structure moves down at one side in the water the cross bar 52 likewise will move down in the same direction thereby, through the action of lever mechanism 53, 55, 59, 63, rotating the lateral stability control fin 69 in the clockwise direction. At the same time, control pin 70 will be moved counterclockwisely or upwardly through action of the link mechanism 54, 56, 60, and 64. The combined, oppositely-directed movements of the lateral stability control fins 69, 70 will impose the required pressures at each side of the wing structure 11 for horizontally stabilizing the craft.

Referring now to FIGS. 1, 2 and 5, illustrating an auxiliary lateral and longitudinal stability control mechanism for the craft, the same comprises a plurailty of streamlined, open-ended intake stacks 73, 74 and 75 extending upwardly from each side of the wing-structure 11 at the front, and centrally at the rear. The upper ends of the intake stacks 73, 74 and 75 are normally at slightly above the water level when the craft is under way, so that water will spill in through intake conduits when the corresponding side or end of the craft sinks slightly lower in the water. As illustrated in FIG. 5, the intake stacks each contain a water conduit 76 leading to a pump 77 forcing intake water through outlet conduit 78 to be forcefully discharged downwardly through a jet orifice 79 located in the underside of the wing-structure 11 in the area beneath the associated intake stack. Such action will raise the wing structure at that side of the craft to achieve lateral stability, as in the case of the intake stacks 73, 74, and longitudinal stability, as in the central intake stack 75. It will be understood that although such correctional action could be made automatic by having the jet pumps operate continuously, they could also be manually controlled by manual operation of the pumps. Alternatively, instead of utilizing intake stacks 73, 74 and 75, an intake port could be provided at the front of the pillar-structure 12 near the lower end thereof through which water would flow under pressure while the craft is under way at high speed, and this water under pressure could be distributed by means of manually controlled valves to variously located jet orifices in the underside of the wing-structure 11 to provide the required corrective forces for both longitudinal and lateral stabilization of the craft.

It is contemplated that the wing structure could be sufficiently large to house cargo, as well as much of the craft's heavy operating machinery and even crew's quarters. In this connection, it is preferred that the wing density be only slightly heavier than the water it displaces. In addition to using cargo and machinery to achieve such density, water ballast facilities could also be provided for use as may be appropriate or desired for maximum performance and proper weight distribution in the craft for stability. To facilitate communication between the wing-structure and the superstructure, an elevator, indicated at 80 in FIG. 2, may be provided within the pillar structure 12. A door 81, of such design as to seal against water and air, can be provided in the side of the pillar structure 12 near the lower end thereof, for use when the craft is on shore or sufficiently elevated to permit its use above the water.

For amphibious operation, moving belts 82, 83 are provided along the underside of the wing-structure 11. Such belts and their operation are described in my patent application Ser. No. 533,962, filed May 31, 1966, and titled Amphibious Vehicle. It will be understood that such moving belts or tracks permit the vehicle to be moved out of the water and along the ground, thereby eliminating the necessity of expensive harbor and docking facilities in most instances.

While I have illustrated and described herein only one form in which the invention can conveniently be embodied in practice, it is to be understood that this form is presented by way of example only, and not in a limiting sense. For example, to provide more efficient banking of the craft while turning at high speed, side portions of the wing member could be hinged along their lengths and appropriately raised or lowered, respectively, to prevent skidding. Also, the pillar structure 12 could be made extensible, or horizontally hinged to maintain the horizontal position of the superstructure while the craft is negotiating a sharp turn. The reactor jets for propulsion could alternatively be placed above the water in the superstructure, for example, for reaction in the air. The invention, in brief, comprises all the modifications and embodiments coming within the scope and spirit of the following claim.

What I claim as new and desire to secure by Letters Patent is:

1. In a water craft, the combination comprising, a substantially flat, streamlined wing-structure, a pillar structure extending upwardly from the center of said wing-structure, a superstructure affixed atop said pillar structure, means for moving said wing-structure through water below the surface of said water, means controlling the longitudinal and lateral stability of said wing-structure as it moves through said water, and means controlling the depth of said wing-structure in said water as it moves through said water so that said superstructure will remain in the air above said wing-structure, said means controlling lateral stability in said wing-structure comprising a pair of stabilizer fins hingedly connected at the rear of said wing-structure at each side thereof, a pendulum in said pillar structure and swingable from side to side in response to movement of said wing-structure about its longitudinal axis, a transverse cross bar secured to the upper end of said pendulum and extending outwardly to each side thereof, and link mechanism interconnecting the ends of said cross bar with said stabilizer fins for opposedly swinging said fins in response to swinging movement of said pendulum with respect to said pillar structure, swinging movement of said stabilizer fins being so directed as to correct for deviations from horizontal level position of said wing-structure.

References Cited

UNITED STATES PATENTS

| | | | |
|---|---|---|---|
| 2,491,541 | 12/1949 | Woodin | 114—66.5 |
| 2,550,220 | 4/1951 | Bussel | 114—66.5 |
| 2,795,202 | 6/1957 | Hook | 114—66.5 |
| 3,006,307 | 10/1961 | Johnson | 114—66.5 |
| 3,171,379 | 3/1965 | Schell et al. | 114—66.5 |
| 3,220,501 | 11/1965 | Lahde | 114—66.5 |

ANDREW H. FARRELL, *Primary Examiner.*